United States Patent
Larsson et al.

(10) Patent No.: US 9,066,319 B2
(45) Date of Patent: Jun. 23, 2015

(54) METHOD OF SENSING IN A RADIO SYSTEM EMPLOYING OPPORTUNISTIC SPECTRUM ACCESS

(75) Inventors: Peter Larsson, Solna (SE); Yngve Selén, Uppsala (SE); Mikael Prytz, Rönninge (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 232 days.

(21) Appl. No.: 13/129,286

(22) PCT Filed: Mar. 23, 2009

(86) PCT No.: PCT/SE2009/050304
§ 371 (c)(1),
(2), (4) Date: May 13, 2011

(87) PCT Pub. No.: WO2010/056180
PCT Pub. Date: May 20, 2010

(65) Prior Publication Data
US 2011/0217922 A1   Sep. 8, 2011

Related U.S. Application Data

(60) Provisional application No. 61/114,838, filed on Nov. 14, 2008.

(51) Int. Cl.
*H04W 84/18*   (2009.01)
*H04W 72/02*   (2009.01)
(Continued)

(52) U.S. Cl.
CPC .......... *H04W 72/02* (2013.01); *H04W 72/0406* (2013.01); *H04W 72/085* (2013.01); *H04W 84/18* (2013.01)

(58) Field of Classification Search
CPC .......... H04W 84/18; H04W 74/0808–74/0825
USPC .................................... 370/252, 329
See application file for complete search history.

(56) References Cited

U.S. PATENT DOCUMENTS

| | | | |
|---|---|---|---|
| 7,423,985 B1* | 9/2008 | Hill | 370/310.1 |
| 8,126,488 B2* | 2/2012 | Albert et al. | 455/502 |

(Continued)

FOREIGN PATENT DOCUMENTS

| | | |
|---|---|---|
| EP | 1 988 724 A1 | 2/2007 |
| JP | 2007-235538 | 9/2007 |
| WO | WO 2007/093653 A1 | 8/2007 |

OTHER PUBLICATIONS

International Preliminary Report on Patentability, PCT Application No. PCT/SE2009/050304, Feb. 14, 2011 (15 pages).
(Continued)

*Primary Examiner* — Khaled Kassim
*Assistant Examiner* — Zhaohui Yang
(74) *Attorney, Agent, or Firm* — Myers Bigel Sibley & Sajovec, PA

(57) ABSTRACT

In a radio system where wireless nodes are in contact, the wireless nodes are enabled to exchange information with adjacent nodes. In addition, distant nodes out of range for direct communication can be communicated with by forwarding data over multiple hops. The wireless nodes are configured to perform sensing of at least one radio resource. A node can be adapted to combine the sensing measurement data into a sensing result, such as an estimate of the probability of whether the resource is free or not. The sensing performed in a node is distributed to at least one other wireless node. Each wireless node can, therefore, access sensing information from at least one other wireless node located in the vicinity of the wireless node. Based on the collective information from at least one other node, a wireless node can make an improved decision if a particular radio resource is free to use or not.

22 Claims, 5 Drawing Sheets

(51) Int. Cl.
  *H04W 72/04* (2009.01)
  *H04W 72/08* (2009.01)

(56) References Cited

U.S. PATENT DOCUMENTS

| | | | | |
|---|---|---|---|---|
| 2004/0203967 | A1* | 10/2004 | Yamaguchi et al. | 455/509 |
| 2007/0214046 | A1* | 9/2007 | Falchuk et al. | 705/14 |
| 2008/0076450 | A1* | 3/2008 | Nanda et al. | 455/422.1 |
| 2008/0225789 | A1* | 9/2008 | Kim et al. | 370/329 |
| 2010/0003922 | A1* | 1/2010 | Zhou et al. | 455/67.11 |
| 2010/0062718 | A1* | 3/2010 | Zhou et al. | 455/456.1 |
| 2010/0069013 | A1* | 3/2010 | Chaudhri et al. | 455/509 |

OTHER PUBLICATIONS

International Search Report and Written Opinion of the International Searching Authority, PCT Application No. PCT/SE2009/050304, Jul. 20, 2009 (16 pages).

Second and Supplementary Notice Informing the Applicant of the Communication of the International Application, PCT Application No. PCT/SE2009/050304, Mar. 17, 2011 (1 pages).

Juncheng Jia et al., "HC-MAC: A Hardware-Constrained Cognitive MAC for Efficient Spectrum Management," IEEE Journal on Selected Areas in Communications, IEEE Service Center, Piscataway, US, vol. 25, No. 1, Jan. 1, 1998, pp. 106-117.

Sethi A et al., "Hammer Model Threat Assessment of Cognitive Radio Denial of Service Attacks", New Frontiers in Dynamic Spectrum Access Networks, 2008. Dyspan 2008. $3^{rd}$ IEEE Symposium on, IEEE, Piscataway, NJ, US, Oct. 14, 2008, pp. 1-12.

Ghasemi A. et al., "Opportunistic Spectrum Access in Fading Channels Through Collaborative Sensing", *Journal of Communications*, vol. 2, No. 2, Mar. 2007, 71-82.

Hou Y.T. et al., "Spectrum Sharing for Multi-Hop Networking with Cognitive Radios", *IEEE Journal on Selected Areas in Communications*, vol. 26, No. 1, Jan. 2008, 146-155.

Huang X. et al., "Weighted-Collaborative Spectrum Sensing in Cognitive Radio", *Second International Conference on Communications and Networking in China*, 2007, 110-114.

Japanese Office Action Corresponding to Japanese Patent Application No. 2011-536282; Date Mailed: Jan. 21, 2014; Foreign Text, 4 Pages, English Translation Thereof, 3 Pages.

* cited by examiner

METHOD OF SENSING IN A RADIO SYSTEM EMPLOYING OPPORTUNISTIC SPECTRUM ACCESS

CROSS REFERENCE TO RELATED APPLICATION

This application is a 35 U.S.C. §371 national stage application of PCT International Application No. PCT/SE2009/050304, filed on 23 Mar. 2009, which claims the benefit of priority of U.S. Provisional Application No. 61/114,838, filed 14 Nov. 2008, the disclosures and contents of which are incorporated by reference herein in their entireties. The above-referenced PCT International Application was published in the English language as International Publication No. WO 2010/056180 A1 on 20 May 2010.

TECHNICAL FIELD

The present invention relates to a method and a device for providing sensing in a radio system with opportunistic spectrum access.

BACKGROUND

Recent research has shown that usage of the radio spectrum is often fairly inefficient. One key factor in this is the current spectrum licensing regime. That is, some part of the radio spectrum is licensed to a party, such as an operator of a radio communications system, who is given an exclusive right to use this part of the radio spectrum. For example, even though significant parts of the useful spectrum is licensed, several measurements (see, e.g. T. Erpek, K. Steadman, D. Jones, "Spectrum Occupancy Measurements: Dublin, Ireland, Collected On Apr. 16-18, 2007", Shared Spectrum Company Report, 2007) indicate that some parts of this spectrum are highly underutilized. Therefore, a more flexible use of the radio spectrum has become a research intensive subject within which the aim is at optimizing, i.e. maximizing, the usage of the available radio spectrum.

To address the above-indicated issues, the FCC (Federal Communications Commission) took, in 2005, an initiative to open up for so-called secondary use of the spectrum. That is, radio resources that, e.g. under a license, are owned by one party—the primary party—may also be used by others (secondary users) for purposes (secondary use) that do not fall within the operation (primary use) of the primary party. Consequently, a secondary user may use radio resources owned by the primary party without having a license and without having made an explicit agreement with the primary party. A requirement for accessing radio resources as a secondary user is that the primary party should not be exposed to harmful interference caused by the secondary use. Therefore a secondary user is allowed to transmit over radio resources owned by the primary party if it can be ensured that the primary party is, for all practical purposes, not affected.

In order to determine when a secondary user can transmit without negatively affecting the primary user some kind of mechanism must be provided. Thus, secondary users should be allowed and the mechanism should enable secondary users to access primary users' spectrum when no primary user's communication quality are (substantially) affected. One approach for assessing the (instantaneous) primary usage of spectrum is to perform sensing, i.e., using sensors (radio receivers) with the goal of measuring the presence of primary transmissions. If a sensing result does not indicate primary usage the measured spectrum may be utilized for secondary access. This type of mechanism is often denoted sensing-based opportunistic spectrum access. The overall objective, simply stated, is to increase capacity as well as individual user throughput. Existing approaches are discussed and evaluated in www.academypublisher.com/jcm/vol02/no02/jcm02027182.pdf, and www.eecs.berkeley.edu/.about.sahai/Papers/ICC06_final.pdf.

Briefly, it can be said that collaborative sensing is built on the idea that collecting multiple sensors' information leads to increased probability of detection and reduced false-alarm probability.

Also a distributed algorithm for collaborative adaptive sensing of fields in an underwater environment is presented in: //perso.eleves.bretagne.ens-cachan.fr/.abouthuguenin/UUST07_Distrib-utedSampling.pdf.

The idea is in part to, in a distributed manner, form clusters of nodes which jointly process gathered information and control the position of nodes for improved sampling of the field.

There is a constant desire to improve the performance of radio systems. Hence there is a need for an improved method of sensing in a radio system employing opportunistic spectrum access. The objective is hence to enhance the detection probability, and/or reduce the false-alarm probability for, for example other users, in a network.

SUMMARY

It is an object of the present invention to overcome or at least reduce some of the problems associated with the existing methods for sensing in opportunistic spectrum access.

It is another object of the present invention to provide an improved method for determining if a certain radio resource is free to use.

At least one of the above objects is obtained by the present invention as set out in the appended claims. Hence in a radio system where wireless nodes are in contact, the wireless nodes are enabled to exchange information with adjacent nodes. In addition distant nodes out of range for direct communication can be communicated with by forwarding data over multiple hops. The wireless nodes, or at least a subset of them, are adapted to perform sensing of at least one radio resource. In accordance with one embodiment a node can be adapted to combine the sensing measurement data into a sensing result, such as (but not limited to) an estimate of the probability of whether the resource is free or not. The outcome of the sensing is distributed to at least one other wireless node and preferably to a multitude of wireless nodes. Each wireless node can therefore access sensing information from at least one other wireless node located in the vicinity of the wireless node. Based possibly on own measurements and/or on the collective information from at least one other node and possibly a multitude of wireless nodes a wireless node can make an improved decision on whether a particular radio resource is free to use or not.

The sensing may in accordance with one embodiment occur with a given periodicity, or may be triggered by an event such as a received message from another node for which the estimated probability of usage has been changed.

In accordance with one embodiment the sensed information is disseminated as quantized information. For example for each resource, a sensing result such as estimated probability of use quantized to at least one bit can be distributed.

In accordance with one embodiment the sensing information or a subset of the sensing information can be distributed by a flooding scheme or a broadcasting scheme. The flooding/broadcasting can in one embodiment be limited based on distribution constraints such as geographic location, range, hop distance, hop number, direction limited. In addition a decision on whether the sensing information such as in the form of a probability is to be distributed or not can in one embodiment be conditioned on the event that the estimated probability of usage has changed by a large enough number.

In one embodiment, the sensing information is time or sequence number stamped.

In accordance with one embodiment a node receiving the sensing information can be adapted to forward the information. Forwarding of sensing information can be limited by flooding constraints or other conditions. For example, a node can be adapted to only forward each message one time. If desired, and in the event a message comprising sensing information can be assumed not to have been delivered to the intended node(s), it may optionally be resent up to M number of times.

In accordance with one embodiment a node is adapted to receive and store sensing information from other nodes, and further adapted to calculate a sensing result, such as probability of resource use, based on stored sensing information from at least one other node and possibly own measurements.

The invention also extends to a method for determining the availability of a radio resource using a radio system node in accordance with the above.

BRIEF DESCRIPTION OF THE DRAWINGS

The present invention will now be described in more detail by way of non-limiting examples and with reference to the accompanying drawings, in which:

FIG. 4 is a view illustrating an exemplary scenario, and.

DETAILED DESCRIPTION

In the examples below dissemination of a probability based metric is used to exemplify the sensing information. However the invention is not limited to dissemination of such a metric. Any sensing information can be disseminated including direct measurement results or some combination of the measurement results.

Consider a channel k. Estimate, in each sensor, the probability that there is a user originating signal in the channel, and denote this estimated probability $P_v$ where v is the sensor identity. If a node only has one sensor, v is also the node identity. Finally, quantize the probability $P_v$ such that it can be transmitted efficiently. In the extreme case $P_v$ can be quantized to a single bit (resource usage detected or not). If a node has several sensors, the values of $P_v$ for such a node may be combined to a single value (prior to, or after quantization), either by fusing the $P_v$ values given from each sensor, or by fusing some other measures, such as the measured baseband signals. Thereby v becomes the node identity for such a multi-sensor node.

Distributing a piece of information to many nodes can be accomplished in several ways, e.g.
  Broadcasting: The message follows a predetermined broadcast tree path.
  Flooding: Any user overhearing a new message just forward it, according to some constraints.
  Broadcasting using a broadcast tree can generally be made more reliable than Flooding, but requires overhead for setting up the tree. The aspect of reliability is manifold. For example, a broadcast tree can be defined such that the probability of message collision (i.e. the instantaneous Signal to Noise Ratio (SNR) is too low to support the used data rate) is low, or the links defined in the tree use acknowledgement on correctly received data, and a number of retransmissions may take place if the forwarding fails.

Figure 1:
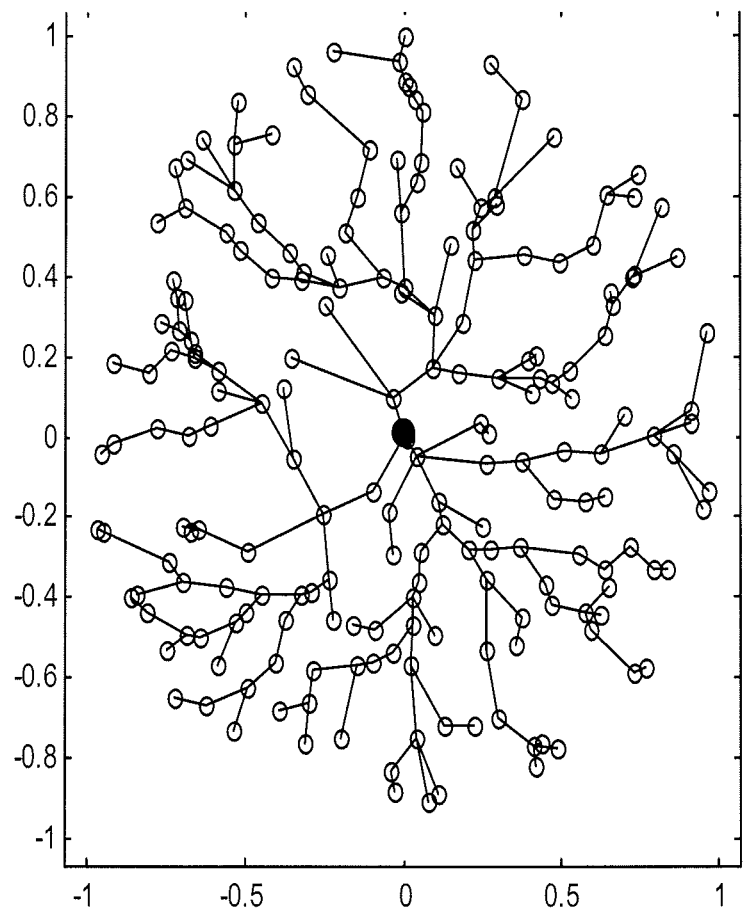
FIG. 1 is a view illustrating a shortest path tree.

Broadcast trees can be determined in different ways. An example of a tree based on the Bellman Ford algorithm (shortest path wrt pathloss), see e.g. the book "Flows in Networks" by Ford Fulkerson and rooted in the central node is illustrated in FIG. 1.

To make sure that only new messages are forwarded each piece of information (or a message with many smaller pieces of information) is tagged with a sequence number or a time tag enabling a receiving node to be able to determine if it is received for the first time or not. If decided to be new to the receiving node, the message may be forwarded, otherwise not.

As the detection probabilities mainly have local relevance, the flooding of this information should be accomplished with some location constraints.

If the nodes know their locations, the probability of the resource being occupied, or other sensing result, could be assigned a certain geographic validity. The flooding/broadcast mechanism then only forwards this information (if necessary) and then within the bounds of the specified area.

If nodes are unaware about their location, one may specify that the message may be sent at most N hops by setting a hop counter in the message to N which is counted downwards for each hop. This is a simple but fairly coarse approach, as the hops may be of different lengths.

The counter can also be based on the received power level, knowledge of the transmit power, and assumptions of the propagation conditions to estimate the distance a message is transmitted. A counter representing the permitted distance for the flooded message may for example count downwards until passing zero after which no further forwarding is allowed.

Figure 2:
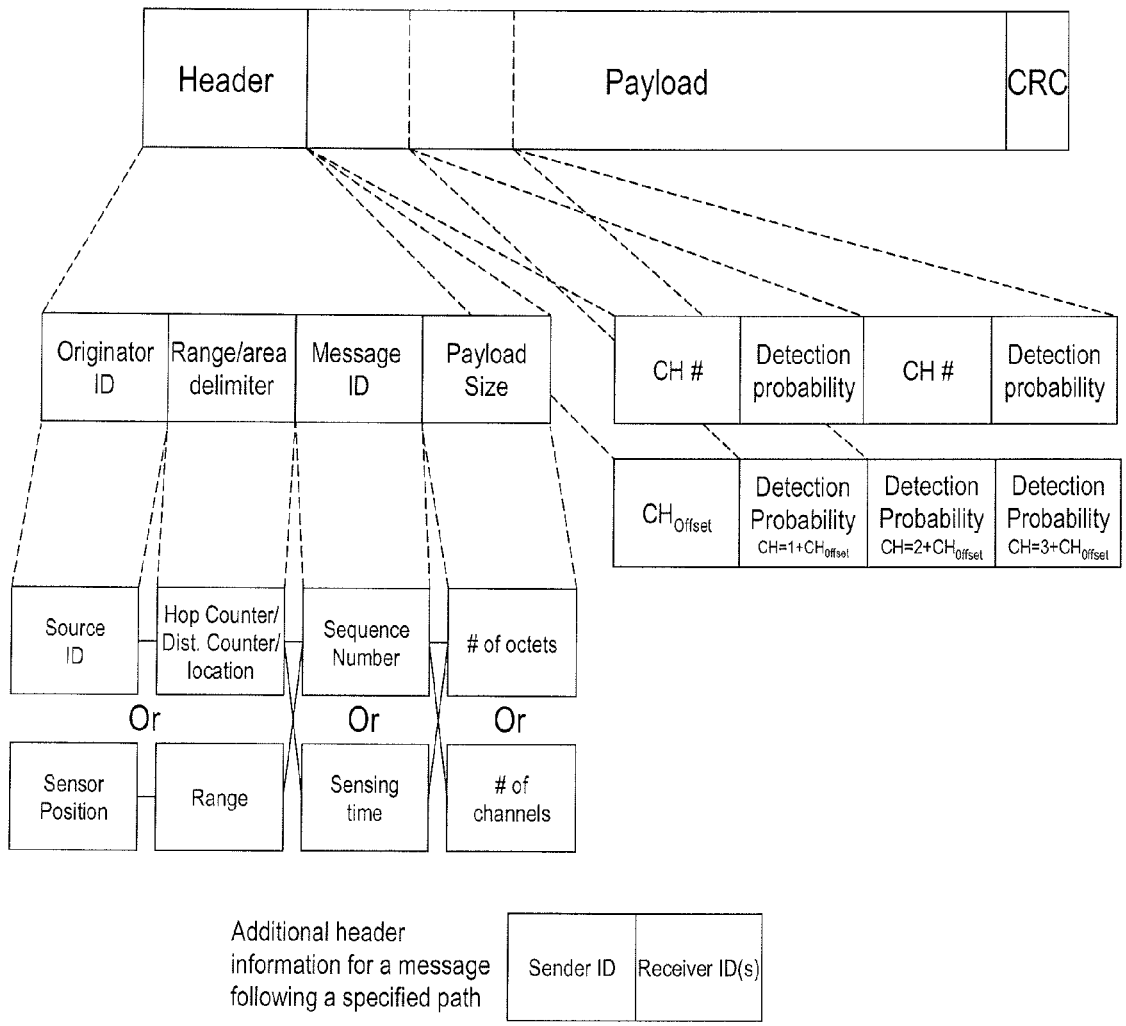
FIG. 2 is a view of an exemplary message.

The message format can be designed in numerous ways. FIG. 2 illustrates some message format examples. For the case where the message first indicates sensor position and then indicates max range, i.e. describing a geographical area of circular shape for which the message is to be distributed within, the nodes must know their positions, e.g. through a positioning system such as Global Positioning System (GPS). The message can for example comprise fields indicating the originating node and or a field corresponding to a range or area delimiter such as a hop counter or similar. The message can also have a message identification field and a field containing at least one sensing result, e.g., a result indicating the probability that a particular radio resource/radio channel is not available for usage.

Based on the above steps, a node will receive messages from nodes within some range or area. These messages will convey quantized sensing information, such as estimated probability of usage for at least one channel.

Hence, at this stage a fused probability, for a node v that has collected information from a set $V_v$ nodes (or sensors), which may include information from own measurements, that primary usage is taking place near the node can be computed by $$P_{Usage} = 1 - \prod_{u \in V_v} (1 - P_u)$$

where $P_u$ describes the (quantized) estimated probability of usage from node u. The above equation holds provided the estimated probabilities from all nodes (or sensors) are given equal weight and are assumed independent. More elaborate schemes for fusing the information supplied by the different nodes are also possible and are also envisaged by the inventors. If multiple and uncorrelated detection probabilities exist from some individual node, those may all be used to improve the reception performance further.

At some time instant, sensed detection data becomes irrelevant as it does not depict the current reality appropriately. The detection process may then, if the time instance of when the measurement was performed is conveyed with the sensing results, be forgotten over time by giving older results/measurements lower weights in a joint measure, e.g., by replacing $P_u$ in the above equation by $a(t_u) P_u$ where $a(t)$ is a decaying function of t and $t_u$ is the age of the measurement from sensor u.

Figure 3:
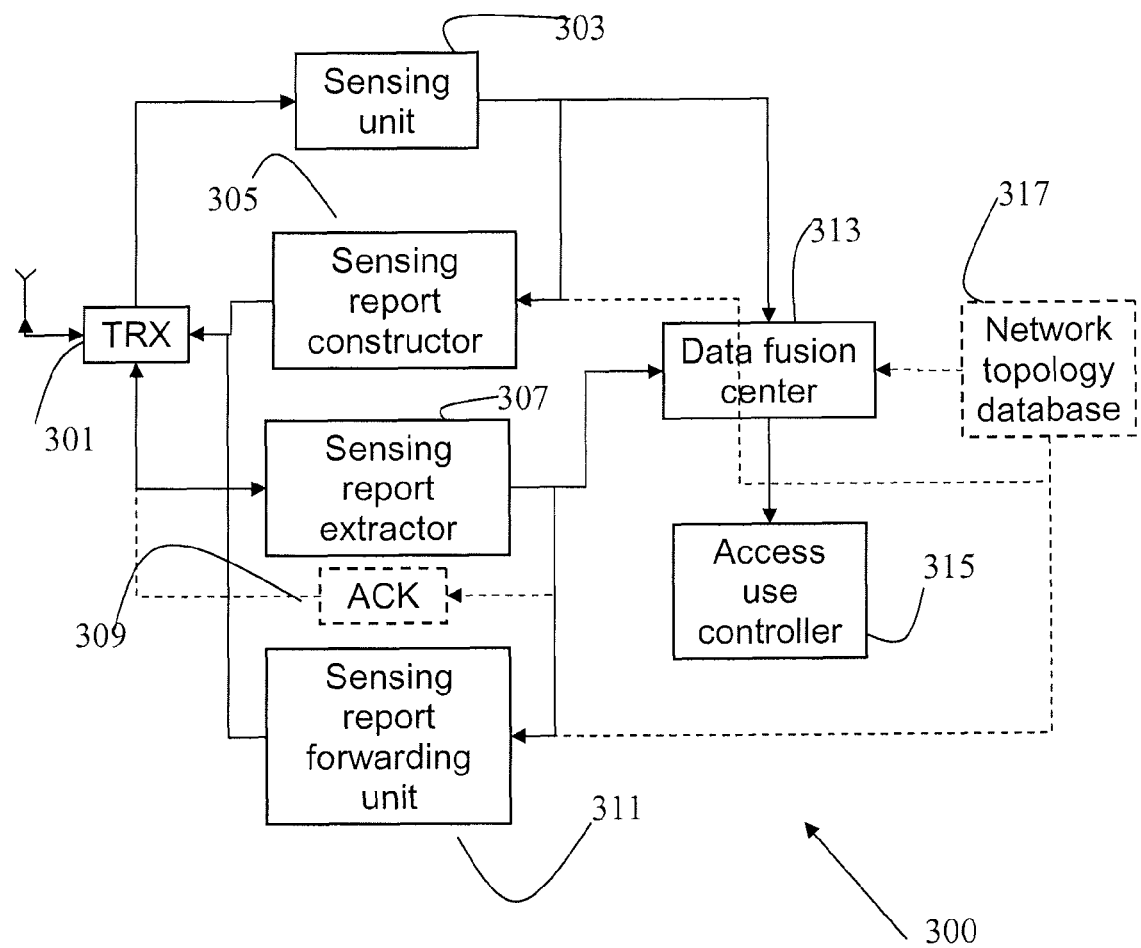
FIG. 3 is a view of a wireless node.

In FIG. 3 functional blocks of a node 300 capable of executing the functionalities as described herein are depicted. The node can for example comprise the following blocks:

TRX block: Transmit and receive unit 301 used for transmitting and receiving data.

Sensing unit 303; This unit is capable of calculating a measure describing the probability of usage of a resource, such as an estimate of the probability of usage of a resource, based upon at least an own measurement.

Sensing report constructor 305; This unit constructs a sensing report message containing at least an indicator of a resource and an estimate of the probability of usage of the resource.

Sensing report extractor; 307: The unit can be adapted to identify a message from the TRX block 301 as a sensing report message, and further adapted to extract information on the concerned resource(s) and the associated estimates of the probability of usage for the resources, and to forward information to a Data fusion center 313 and the Sensing report forwarding unit 311.

ACK/NAK unit 309. This unit can acknowledge (ACK) or Negative acknowledge (NAK) received Sensing report messages to ensure reliable delivery.

Sensing report forwarding unit 311: This unit can decide whether a received Sensing report message should be forwarded or not depending on forwarding constraints (hop count, time, distance, etc) contained in the message. Modifies the forwarding constraints as appropriate before passing the message to the TRX unit 301.

Data fusion center 313: This unit can aggregate information from the Sensing unit on, e.g., estimates of the probability of usage of resource(s) with information received from other nodes through Sensing report messages.

Access use controller 315: Decides whether or not to use the resources for which (aggregated) probability of usage estimates have been derived.

Network topology database 317: This database can keep track of the network topology, for example, in one (or more) forwarding tables, if the Sensing report messages are distributed in a broadcasting tree.

Figure 4:
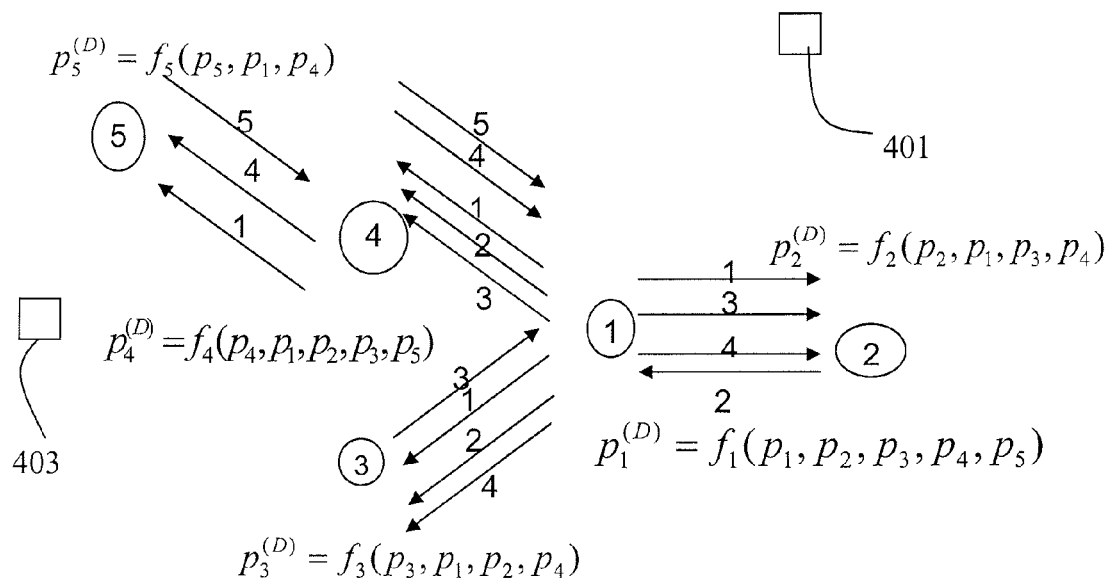

Further, in FIG. 4 an exemplary scenario with a system consisting of 5 nodes, numbered 1 to 5 further illustrating the method and nodes as described herein is shown. Also, some other users 401 and 403 from another system are present in FIG. 4. The nodes 1 to 5 exchange information between one another according to the description of the invention. In the example depicted in FIG. 4, the nodes propagate information over two hops; a node which receives a message which has made only a single hop forwards it, but if the message has already made two hops it will not be forwarded. The numbered arrows in the figure indicate sensing information originating from the node corresponding to the number of the arrow. In the example depicted in FIG. 4, node 1 first receives estimated probabilities of usage from all nodes: over one hop from nodes 2, 3 and 4, and over two hops from node 5 (via node 4). Node 5 receives probabilities of usage from nodes 1 and 4, but not from nodes 2 and 3, since they have a hop distance larger than two.

Each node can, based upon the own and the received sensing information, compute updated probabilities of usage, $P_{usage}$. Each node has a function, $f_v$, where v is the node number, which illustrates how these probabilities of usage are computed, and based upon which information (see example above).

The above example illustrates message propagation via a broadcast tree in which the presence of arrows indicates connected nodes.

Figure 5:
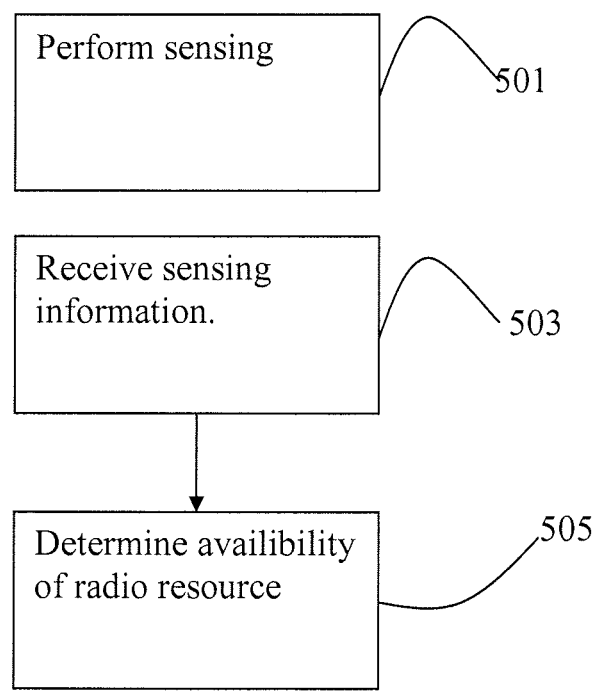
FIG. 5 is a flowchart depicting some procedural steps performed by a wireless node.

In FIG. 5 a flowchart depicting some of the procedural steps performed by a wireless node as described above is shown. Thus, a wireless node for determining access to a radio spectrum in a radio system is provided. The wireless node is in contact with and exchange information with other wireless nodes of the radio system. The wireless node can perform the following procedural steps. First in a step 501 the wireless node performs sensing of at least one radio resource. Next in a step 503 the wireless node receives the outcome from a sensing of at least one radio resource performed by another wireless node. Based on collective sensing information including sensing information from at least one other wireless node the wireless node determines if a particular radio resource is free to use or not in a step 505.

Using the method and node as described herein will provide a simple, distributed and sensitivity enhanced detection of resource usage. This mechanism can for example be used by mobile terminals but also a fixed node as a base station can be involved on equal terms as the other mobile terminals.

The invention claimed is:

1. A wireless node for use in a radio system, the wireless node being configured to be in contact with and exchange information with other wireless nodes of the radio system, comprising:

means for performing sensing of at least one radio resource;

means for exchanging information with adjacent ones of the wireless nodes;

means for distributing an outcome of the sensing of the at least one radio resource to at least one other of the wireless nodes;

means for receiving an outcome from a sensing of at least one radio resource performed by another one of the wireless nodes, and means for determining if a particular radio resource is free to use based on collective sensing information including the outcome from the sensing performed by the another one of the wireless nodes, and wherein the wireless node is configured to communicate information by forwarding data over multiple hops;

wherein the outcome of the sensing of the at least one radio resource performed by the wireless node has a geographic validity associated therewith;

wherein the collective sensing information is weighted based on times that the sensing was performed such that more recent sensing information is given greater weight than older sensing information in determining if the particular radio resource is free;

wherein the wireless node is configured to forward sensing information received from one of the wireless nodes to another one of the wireless nodes; and wherein the wireless node is provided with a limit on forwarding the sensing information based on whether the wireless node has knowledge of its geographic location and the geographic location of the another one of the wireless nodes such that the sensing information is forwarded only within a geographic boundary defined by the geographic validity associated with the outcome of the sensing.

2. The wireless node according to claim 1, wherein the wireless node is configured to combine the collective sensing information into a sensing result.

3. The wireless node according to claim 2, wherein the sensing result is an estimate of a probability of whether the resource is free.

4. The wireless node according to claim 1, wherein the wireless node is configured to receive outcomes from a sensing of the at least one radio resource performed by a plurality of the wireless nodes.

5. The wireless node according to claim 1, wherein the wireless node is configured to perform sensing of the at least one radio resource with a given periodicity.

6. The wireless node according to claim 1, wherein the wireless node is configured to perform sensing of the at least one radio resource based on a trigger event.

7. The wireless node according to claim 6, wherein the trigger event is a received message from another one of the wireless nodes for which an estimated probability of usage has been changed.

8. The wireless node according to claim 1, wherein the wireless node is configured to disseminate the sensing information as quantized information.

9. The wireless node according to claim 1, wherein the wireless node is configured to time stamp or sequence number stamp the sensing information.

10. The wireless node according to claim 1, wherein the limit is a flooding constraint.

11. The wireless node according to claim 1, wherein the limit is a maximum node hop count.

12. A method in a wireless node for determining access to a radio spectrum in a radio system, wherein the wireless node is in contact with and exchanges information with other wireless nodes of the radio systems, comprising:
    sensing at least one radio resource;
    exchanging sensing information including an outcome of the sensing of the at least one radio resource with adjacent ones of the wireless nodes;
    receiving the outcome from a sensing of at least one radio resource performed by another one of the wireless nodes; and
    determining if a particular radio resource is free to use based on collective sensing information including the outcome from the sensing performed by the another one of the wireless nodes, and wherein the wireless node is configured to communicate information by forwarding data over multiple hops;
    wherein the outcome of the sensing of the at least one radio resource performed by the wireless node has a geographic validity associated therewith;
    wherein the collective sensing information is weighted based on times that the sensing was performed such that more recent sensing information is given greater weight than older sensing information in determining if the particular radio resource is free;
    forwarding sensing information received from one of the wireless nodes to another one of the wireless nodes; and
    receiving a limit on forwarding the sensing information, the limit being based on whether the wireless node has knowledge of its geographic location and the geographic location of the another one of the wireless nodes such that the sensing information is forwarded only within a geographic boundary defined by the geographic the outcome of the sensing.

13. The method according to any of claim 12, further comprising combining the collective sensing information into a sensing result.

14. The method according to claim 13, wherein the sensing result is an estimate of a probability of whether the resource is free.

15. The method according to claim 12, further comprising receiving outcomes from a sensing of the at least one radio resource performed by a plurality of the wireless nodes.

16. The method according to claim 12, further comprising performing sensing of the at least one radio resource with a given periodicity.

17. The method according to claim 12, further comprising performing sensing of the at least one radio resource based on a trigger event.

18. The method according to claim 17, wherein the trigger event is a received message from another one of the wireless nodes for which an estimated probability of usage has been changed.

19. The method according to claim 12, further comprising disseminating the sensing information as quantized information.

20. The method according to claim 12, further comprising time stamping or sequence number stamping the sensing information.

21. The method according to claim 12, wherein the limit is a flooding constraint.

22. The method according to claim 12, wherein the limit is a maximum node hop count.

* * * * *